March 4, 1969   RYOSO MATSUMOTO ET AL   3,430,492
APPARATUS FOR MEASURING CONTINUOUSLY THE TEMPERATURE
OF TRAVELING YARN
Filed Oct. 18, 1965
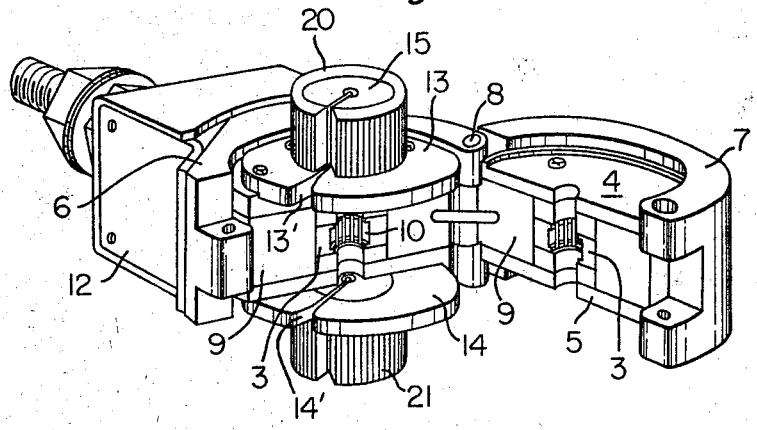
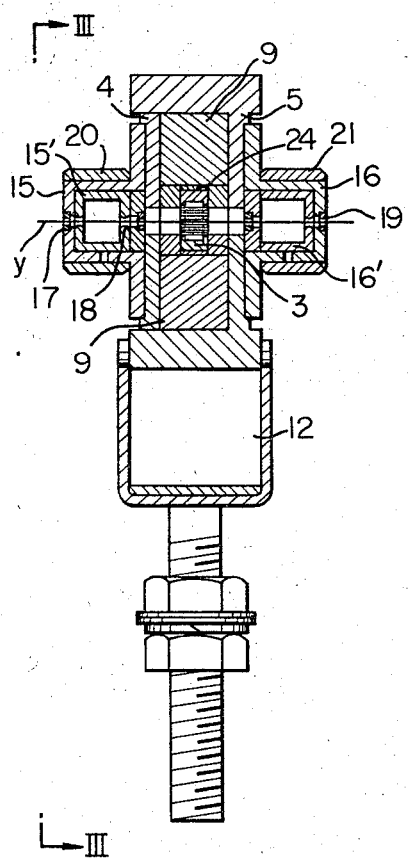
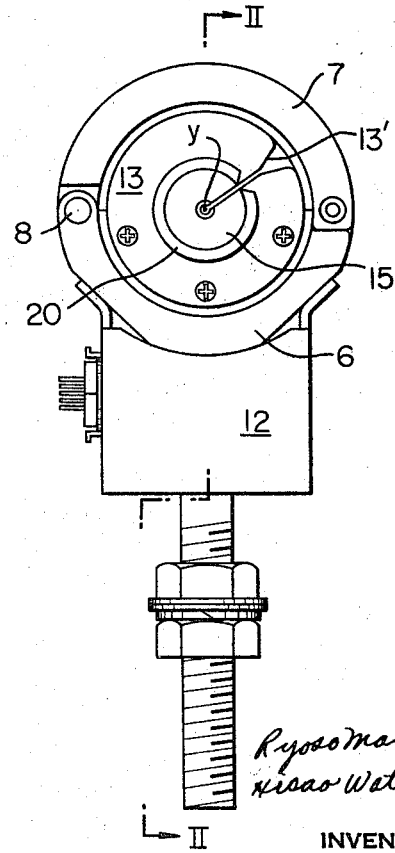
Ryoso Matsumoto
Hisao Watanabe,
INVENTORS
BY Wenderoth, Lind
and Ponack ATTORNEYS United States Patent Office 3,430,492
Patented Mar. 4, 1969

3,430,492
APPARATUS FOR MEASURING CONTINUOUSLY THE TEMPERATURE OF TRAVELING YARN
Ryoso Matsumoto, Toyonaka-shi, Osaka-fu, and Hisao Watanabe, Chigasaki-shi, Japan, assignors of one-half to Teijin Limited, Osaka, Japan and one-half to Tokyo Seiko Co., Ltd., Tokyo, Japan, both corporations of Japan
Filed Oct. 18, 1965, Ser. No. 496,773
Claims priority, application Japan, Dec. 25, 1964, 39/73,251
U.S. Cl. 73—361
Int. Cl. G01k 5/52
8 Claims

ABSTRACT OF THE DISCLOSURE

An apparatus for continuously measuring the temperature of a traveling yarn. A heat conductive hollow cylindrical member is provided, only the inner peripheral surface of which is electrically nonconductive. The cylindrical member is splittable with respect to the axis through which a yarn passes. A plurality of thermocouple elements are connected in series and disposed completely around the inner periphery of the cylindrical member concentrically of said axis.

---

Figure 4:
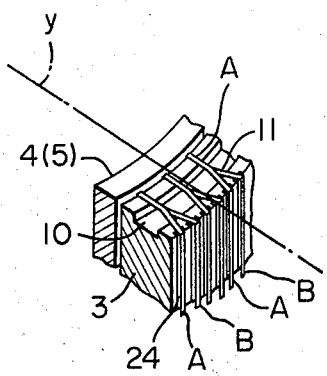

This invention relates to an apparatus for measuring continuously the temperature of yarn, such as twisted yarn, wooly yarn, stretched yarn and spun yarn, during their travel.

The determination of the temperature of a body is usually performed by contacting a thermometric element therewith and measuring the temperature that appears in the thermometric element. However, in contacting a thermometric element with a traveling yarn and determining continuously the temperature thereof, there occurs a time lag in the detection of the yarn temperature by means of the direct contact of the thermometric element and the yarn, and generally such a method cannot cope with the situation where changes in yarn temperature take place momentarily. Further, even though it is attempted to follow and measure the temperature changes by increasing the sensitivity of the thermometric element, the accurate determination of the temperature is difficult since adjustments must be made in connection with the secondarily evolved heat resulting from the frictional energy between the yarn and the thermometric element. In addition, in such a case wear will occur to both the yarn and the element because of the friction between them and, as a result, not only is the quality of the yarn impaired but also damage occurs to the thermometric element so that its use over a long period is not possible.

However, since the aforesaid traveling yarn emanates radiant energy which is related to the surface temperature of the yarn, the latter can be found by apprehending the former. The temperature of the yarn is however low and its surface area is very small, and hence its radiant energy is exceedingly minute. In addition, an air stream is set up surrounding the yarn owing to its travel at a high speed, with the consequence that measurements of the temperature made at circumambient locations very close to the yarn do not become reliable measurement values of the surface temperature of the yarn. Thus, it is a very difficult matter to determine the temperature of a traveling yarn continuously.

The present invention provides an apparatus which eliminates the foregoing shortcomings and measures very accurately the temperature of a yarn continuously, thus making it possible to carry out very readily the temperature control and the evaluation of the yarn properties in such processes of making twist and wooly yarns as well as in spinning.

The continuous temperature measurement apparatus of traveling yarn according to the present invention comprises a thermally and electrically insulated cylindrical member, which is splittable with respect to the axis of the passing yarn, and a plurality of thermocouples connected electrically in series and disposed completely about the inner periphery of said cylindrical member concentrically of said axis.

In an apparatus such as this, the heat energy emanating from the yarn traveling through said cylindrical body heats the plurality of thermocouple elements disposed about the inner periphery of the cylindrical member, and then the minute electromotive forces which are set up in the several thermocouple elements are totaled to set up a potential relatively corresponding to the heat energy radiated at the both ends of the serially connected plurality of thermocouples. Thus, by measuring this potential, the radiant energy, i.e. the relatively corresponding temperature of the yarn can be determined. And by making the thermal capacity of each thermocouple element small, i.e. by enhancing their sensitivity, the following and measuring of even the momentary changes in the temperature of the traveling yarn is made possible.

The invention is fully described below with reference being had to the accompanying drawings. The present invention is however not to be limited to the following description only.

Figure 5:
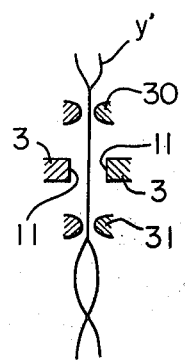
Figure 6A:
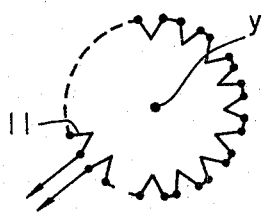
Figure 6B:
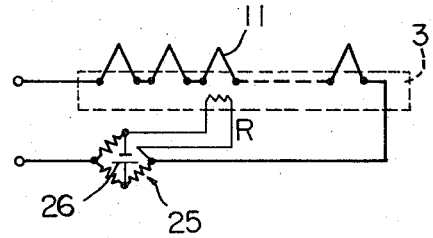
Figure 7:
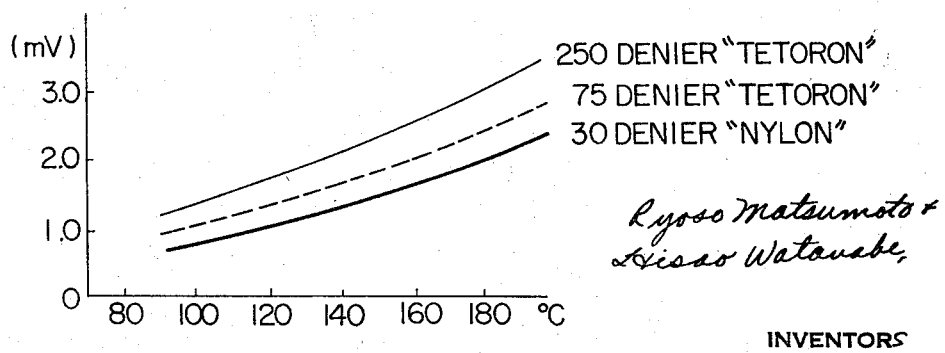

FIGURE 1 is a perspective view illustrating the invention apparatus as split open. FIGURE 2 is a view in longitudinal section along the axis, FIGURE 3 being a plan view looking in the direction of III—III of FIGURE 2. FIGURE 4 is a partial perspective view illustrating the manner of installing the thermocouple elements. FIGURE 5 is a view illustrating the relationship of the several members which shows the manner in which ballooning is prevented when determining the temperature of a false twist yarn. FIGURE 6a is a circuit diagram of the arrangement of the thermocouple elements of the energy conversion mechanism, and FIGURE 6b is a circuit diagram in which is incorporated a compensatory circuit for the cold junctions of the elements. FIGURE 7 is a graph showing the power output characteristics of the invention apparatus with respect to the yarn temperature.

Externally, the invention apparatus appears as follows:

A heat conductive, hollow cylindrical member 3 whose surface has been imparted an electric insulating treatment and which is splittable axially into two parts is disposed with a pair of intervenient members 4 and 5 comprising hollow cylindrical members having the same diameter as that of said first-named cylindrical member in such a fashion that the inner diameters of said intervenient members 4 and 5 and that of the hollow member 3 are in alignment and also such that the intervenient members 4 and 5 and the hollow member 3 are splittable as one body. These members are then inserted into a casing which is splittable into a fixed semicylindrical casing 6 and a movable semicylindrical casing 7 which are hinged together by means of a pin 8, each half of the foregoing hollow member 3 and intervenient members 4 and 5 being inserted in respectively the fixed and movable semicylindrical casings 6 and 7. Another intervenient member 9 is inserted between the hollow member and intervenient members 4, 5 and the casing, and secured. The apparatus is thus in a state as to be freely openable and closeable.

About the inner periphery 10 of said cylindrical member 3 are disposed a plurality of thermocouple elements 11 consisting of A and B so as to make one round of the peripheral surface (see FIGURES 4 and 6a and 6b).

The elements 11 are connected in series, and finally the two ends which become the output terminals are disposed at the attachment part 12 of the fixed casing 6. The intervenient members 4 and 5 have secured externally thereof guide plates 13 and 14, respectively, which are provided with slits 13' and 14' for insertion of the yarn, the slits being in alignment with each other. Hollow guiding devices 15 and 16 are installed at the yarn introductive and yarn eductive portions facing outwardly from the respective guide plates 13 and 14 in such a fashion that the center of the holes of the guiding devices 15 and 16 coincides with the axis of cylinder 3. The guiding devices consist respectively of inner and outer tubes 15, 15' and 16, 16' and have slits in the curved surfaces of said inner and outer tubes which are in alignment with the aforesaid slips 13' and 14'. The inner and outer tubes 15 and 15' of the guiding device at the yarn introduction part are provided at their both ends with yarn guide orifices. The orifice at the yarn entry portion 17 serves to prevent the entry into the tube of an air stream from the outside along with the movement of yarn y. On the other hand, the orifice at the yarn exit portion 18 serves to maintain the yarn y in the axial center of the tube in cooperation with a hereinafter described orifice of the guiding device 16. The inner and outer tubes of the guiding device at the yarn eductive part are provided with orifices in only the yarn exit portion 19, which, in cooperation with the foregoing orifices of device 16, guide the yarn. In these guiding devices, the inner tubes are rotatably adjustable with respect to the outer tubes by means of adjusting members 20 and 21. Thus, after having aligned the slits and inserted the yarn, the inner tubes are rotated to shift the slits out of alignment and hence prevent the yarn from slipping out. These guiding devices are made from either sapphire, quartz, ceramics or metal.

It was the practice hitherto to adhere the thermocouple to an insulating material. Hence, in maintaining the cold junction temperature constant by heating or cooling it from the outside, there was generally a time lag in the heating and cooling effects in the case of a material whose heat conductivity was inferior, such as in the case of insulating materials. Thus the compensation of the temperature could not be fully accomplished. Particularly, in the case where a plurality of thermocouple elements are connected in series, when there occurs a temperature gradient along said elements in the insulating material which holds the cold junctions of the thermocouple elements or when the temperature distribution is not uniform at the portions where the elements are held, a fluctuation takes place in the electromotive force that are generated at the elements even though an identical temperature is applied to the hot junctions of the elements. Hence, it is necessary to uniformalize the surface temperature of the electrical insulating member holding the cold junctions. Since the cylindrical member 3, the supporting member of the thermocouple in the present invention, is a hollow cylindrical member having thermal conductivity whose surface has been imparted an electrical insulating treatment, as hereinbefore described, a thin film (not visible in FIG. 4) is formed between the inner peripheral surface 10 and the thermocouple elements 11, which is electrically a nonconductor but thermally a good conductor. This thin film can be achieved by treating the surface of the aluminum, the base metal of the cylindrical member 3, to form an oxidized film thereon. This thin film is known in Japan, the United States of America and Germany by the trade names of "Alumite," "Alumirite," and "Eloxal," respectively. Further, pins 24 having electrical conductivity, for example, of copper, in a number equal to that of the thermocouple elements are embedded along the outer periphery of the cylindrical member 3 of aluminun, and the cold junctions of the aforesaid thermocouple elements are individually connected electrically to these pins. By doing thus, the individual cold junctions are all held at the same temperature through the medium of the thermally conductive copper and aluminum. Furthermore, they are well adaptable to changes in external temperature (for instance, changes in room temperature). Thus, the cold and hot junctions are always maintained at the same temperature with no lag in heat conduction. The foregoing copper pins can be fixed to the aluminum cylinder by any suitable means, but they may also be adhered with adhesives. The thermocouple elements can be reinforced by extending either of A or B, or both, which extend beyond the hot junction and securing this to the supporting member 3. It is desirable to make the foregoing reinforcement, since the thermocouple elements used in this invention are made of a very thin material for making their thermal capacity exceedingly small and thus to improve their sensitivity.

Further, there is a necessity for compensating the variations of the electrical energy (i.e. the output voltage) converted from radiant energy from the yarn in concomitance with the changes in the temperature of the cold junctions, and hence that of the hot junctions, that take place as a result of heating and cooling from the outside. For this purpose, a thermosensitive resistance member R is provided in the supporting member 3, and by using this as one side of a bridge and by providing a bridge circuit 25, as shown at the right side of FIGURE 6, in series with the thermocouple, the resistance of the resistance member rises along with a rise in the temperature of the support piece, and hence when the output voltage declines, the output voltage is compensated by means of a power source 26 of the bridge circuit. On the other hand, when the resistance decreases, the voltage of the power source acts to reduce the output voltage.

In order to apprehend the heat waves which are minute and of long wavelength, in the present invention, as hereinbefore described, a plurality of thermocouple elements are disposed along the whole circumferential direction of a circumference concentric to the traveling yarn y and these are connected electrically in series, thereby taking out to the outside the sum total of the electromotive force generated by the several thermocouple elements. And this electrical output corresponds to the surface temperature of the yarn. Hence, if the relationship between this electromotive force and the temperature is determined in advance, the continuous measurement of the temperature change is made possible.

The reason for arranging the thermocouple elements about the concentric circumference of the traveling yarn in the present invention is to enable the effective absorption of the energy emanating in directions 360 degrees from the yarn y. Further, a matter which frequently gives rise to trouble in the heat ray zone is that of the effects of stray light as external disturbances, but since yarn introductive and eductive parts have been provided before and after the assembly of the thermocouple elements, such troubles are avoided.

In general, when the thickness of the yarn changes, the over-all energy emanating changes even though the surface temperature is the same, and yarn takes on a character as if its apparent temperature has changed. In the present invention however, a distance to the detection tips from the yarn is used which is much greater than the yarn diameter, and hence the effect on the measurement precision is slight. For instance, it is possible to make measurement error of the order of ±1–2° C. with respect to a yarn thickness variations of ±20%. In addition, as to the swing of the yarn from its central position, the effect on the over-all output is slight since the several thermocouple elements complement each other. For instance, the error in this case is also ±1–2° C. to a ±20% fluctuation from the center.

The greatest problem in a measurement apparatus such as this is the matter of the effect of the air stream on the measurement precision. If the yarn is passed through at a speed of the order of 500 m./min., the air stream which is entrained with by the yarn subjects the thermocouple elements to a cooling effect and the measurement readings exhibit a variation of ±5–15° C. In the present invention, this can be prevented however by constructing the guides as hereinbefore described.

When the invention apparatus was employed and temperature determinations were made of 30-denier nylon yarn and 75 and 250-denier polyethylene terephthalate filaments, electromotive forces of 1.0 to 3 mv. terminal voltages could be set up against temperature changes, which plots with a relatively simple curve, as shown in FIGURE 7.

When the temperature of a processed yarn $y'$ is to be measured, ballooning of the yarn $y'$ take place and the apparent yarn diameter becomes great to result in errors in the measurement. In a case such as this, a pair of guides 30 and 31 are conveniently provided as shown in FIGURE 5 relatively close together with the thermocouples 11 intervening. The ballooning at the site of measurement can be thus prevented.

Further, the present invention can be applied to the temperature control of the yarn heating source by feeding back to said source the changes in yarn temperature determined by the present apparatus.

We claim:

1. An apparatus for measuring continuously the temperature of a traveling yarn, said apparatus comprising a heat conductive hollow cylindrical member, only the inner peripheral surface of which is electrically nonconductive, said cylindrical member being splittable with respect to the axis wherein a yarn passes through, and a plurality of thermocouple elements connected in series and disposed completely about the inner periphery of said cylindrical member concentrically of said axis.

2. An apparatus according to claim 1 wherein are disposed in said cylindrical member a pair of hollow intervenient member having an inner diameter identical to that of said cylindrical member, the arrangement of said hollow members being such that the hollow parts of each are disposed on the two sides of said cylindrical member with the diameters of each of said hollow members in alignment with each other and splittable as one body with said cylindrical member.

3. An apparatus according to claim 2 wherein is provided a yarn guiding means at the yarn entry side of said intervenient members for preventing the entry of a turbulent air stream from the yarn inlet during the passage of a yarn through said cylindrical member.

4. An apparatus according to claim 2 wherein are provided guiding means at both sides of said intervenient members for ensuring the passage of the yarn through the axial center of said cylindrical member.

5. An apparatus according to claim 1 wherein said heat conductive hollow cylindrical member, only the inner peripheral surface of which is electrically nonconductive, has been imparted its electrical nonconductivity by an oxidation treatment of the surface of the cylindrical member of aluminum.

6. An apparatus according to claim 1 wherein are secured about the outer periphery of said cylindrical member a plurality of electrical conductors as electrical contacts of said thermocouple elements.

7. An apparatus according to claim 1 wherein one or both ends of the end which is not the cold junction of the plurality of thermocouple elements disposed about the inner periphery of said cylindrical member are extended and secured to one side of said cylindrical member.

8. An apparatus according to claim 1 wherein is provided a temperature compensating means having a thermosensitive resistance member disposed at that part where the cold junctions are disposed, said means being provided for compensating the temperature of the cold junctions of the plurality of pairs of thermocouples.

References Cited

UNITED STATES PATENTS 3,282,107    11/1966    Ekstrom _ _ _ _ _ _ _ _ _ _ _    136—224

WINSTON A. DOUGLAS, *Primary Examiner.*

C. F. LE FEVOUR, *Assistant Examiner.*

U.S. Cl. X.R.

73—343; 136—224